United States Patent
Prasad et al.

(10) Patent No.: US 12,117,908 B2
(45) Date of Patent: Oct. 15, 2024

(54) RESTORING PERSISTENT APPLICATION DATA FROM NON-VOLATILE MEMORY AFTER A SYSTEM CRASH OR SYSTEM REBOOT

(71) Applicant: Intel Corporation, Santa Clara, CA (US)

(72) Inventors: Aravinda Prasad, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 17/111,832

(22) Filed: Dec. 4, 2020

(65) Prior Publication Data

US 2021/0089411 A1 Mar. 25, 2021

(51) Int. Cl.
G06F 11/07 (2006.01)
G06F 11/14 (2006.01)
G06F 12/1009 (2016.01)
G06F 12/1036 (2016.01)
G06F 12/109 (2016.01)

(52) U.S. Cl.
CPC ...... *G06F 11/1471* (2013.01); *G06F 12/1009* (2013.01); *G06F 12/1036* (2013.01); *G06F 12/109* (2013.01); *G06F 2212/1032* (2013.01)

(58) Field of Classification Search
CPC ............. G06F 11/1471; G06F 12/1009; G06F 12/1036; G06F 12/109; G06F 2212/1032
USPC .......................................................... 714/15
See application file for complete search history.

(56) References Cited

U.S. PATENT DOCUMENTS

| | | | |
|---|---|---|---|
| 2007/0174912 A1* | 7/2007 | Kraemer | G06F 21/552 726/23 |
| 2012/0084496 A1 | 4/2012 | Rudelic | |
| 2013/0061096 A1* | 3/2013 | McCoy | G06F 11/366 714/45 |
| 2014/0324785 A1* | 10/2014 | Gupta | G06F 16/2358 707/689 |
| 2018/0365141 A1 | 12/2018 | Dragojevic | |
| 2019/0205745 A1* | 7/2019 | Sridharan | G06F 9/5061 |
| 2020/0183854 A1 | 6/2020 | John | |

FOREIGN PATENT DOCUMENTS

EP 3614284 A1 * 2/2020 ......... G06F 12/1009

OTHER PUBLICATIONS

R. Achermann et al., "Mitosis: Transparently Self-Replicating Page Tables for Large-Memory Machines," Nov. 8, 2019, pp. 283-300.
Extended European Search Report for European Patent Application No. 21198353.1, mailed Mar. 22, 2022, 15 pages.

* cited by examiner

*Primary Examiner* — Chae M Ko
(74) *Attorney, Agent, or Firm* — Jordan IP Law, LLC (57) ABSTRACT

Systems, apparatuses and methods may provide for technology that associates a unique identifier with an application, creates an entry in a metadata table, wherein the metadata table is at a fixed location in persistent system memory, populates the entry with the unique identifier, a user identifier, and a pointer to a root of a page table tree, and recovers in-use data pages after a system crash. In one example, the in-use data pages are recovered from the persistent system memory based on the metadata table and include one or more of application heap information or application stack information.

25 Claims, 6 Drawing Sheets

RESTORING PERSISTENT APPLICATION DATA FROM NON-VOLATILE MEMORY AFTER A SYSTEM CRASH OR SYSTEM REBOOT

TECHNICAL FIELD

Embodiments generally relate to restoring application data. More particularly, embodiments relate to technology that restores persistent application data from non-volatile memory after a system crash or system reboot.

BACKGROUND

Recent developments in memory technology may provide for the use of large capacity, non-volatile (e.g., persistent) system memory to store application data such as heap information (e.g., global variables) and stack information (e.g., local variables) during execution of the application. When the computing system reboots after a system crash or power cycle (e.g., normal reboot), the application data in the non-volatile system memory may become unusable under conventional approaches.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
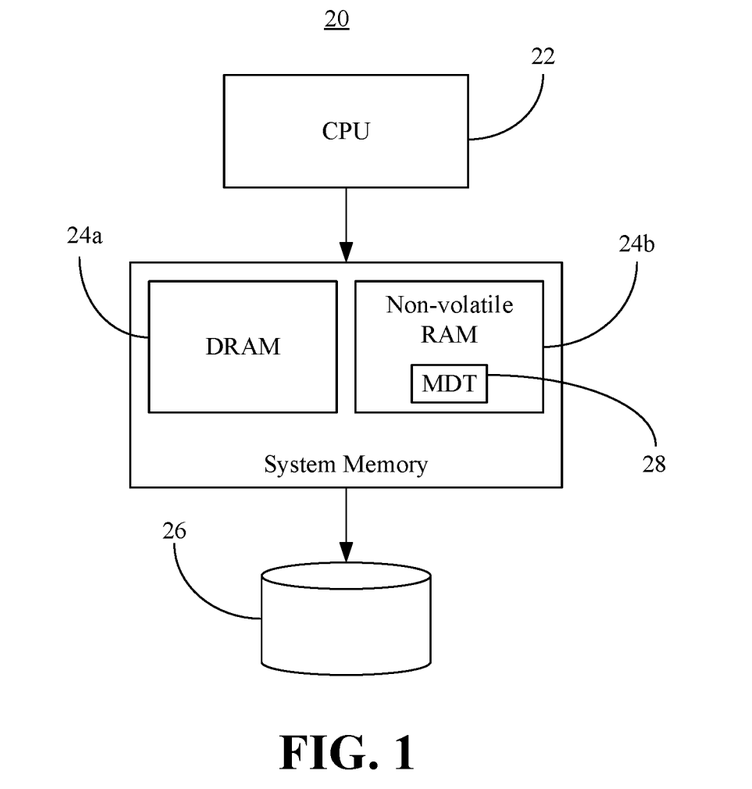
FIG. 1 is a block diagram of example of a system architecture according to an embodiment.

Turning now to FIG. 1, a system architecture 20 is shown in which a central processing unit (CPU, e.g., host processor) 22 is coupled to a system memory 24 (24a-24b) and the system memory 24 is coupled to mass storage 26 (e.g., hard disk drive/HDD). In the illustrated example, the system memory 24 includes both a dynamic random access memory (DRAM, e.g., volatile memory) 24a and a non-volatile RAM (e.g., persistent memory) 24b. During execution of an application (e.g., web browser, multi-user game) by the CPU 22, application process information (e.g., heap and/or stack information) may be written to one or more data pages in the non-volatile RAM 24b. In addition to the data pages, the non-volatile RAM 24b may include page table entries that store virtual to physical page mapping and page permissions that are allocated dynamically. In an embodiment, a memory region referred to as a "page table page" is dynamically allocated on a per application basis, where each page table page includes a page global directory (PGD) and a page middle directory (PMD). For example, a PMD that points to an array of page table entries may be dynamically allocated whenever an application page faults on a virtual address for the first time.

As will be discussed in greater detail, a metadata table (MDT) 28 is maintained at a pre-determined (e.g., fixed) location in the non-volatile RAM 24b to facilitate the recovery of in-use data pages after a system crash or normal reboot. More particularly, the MDT 28 may store information about the page table pages corresponding to an application in a known format and a pre-determined location. After a system crash, the rebooted operating system (OS) may read the MDT 28 to identify pages in the non-volatile RAM 24b that "belong" to an application and proceed to restore the data. Additionally, embodiments provide a seamless and less intrusive interface to restore the data into the virtual address space of the application upon system reboot.

Figure 2:
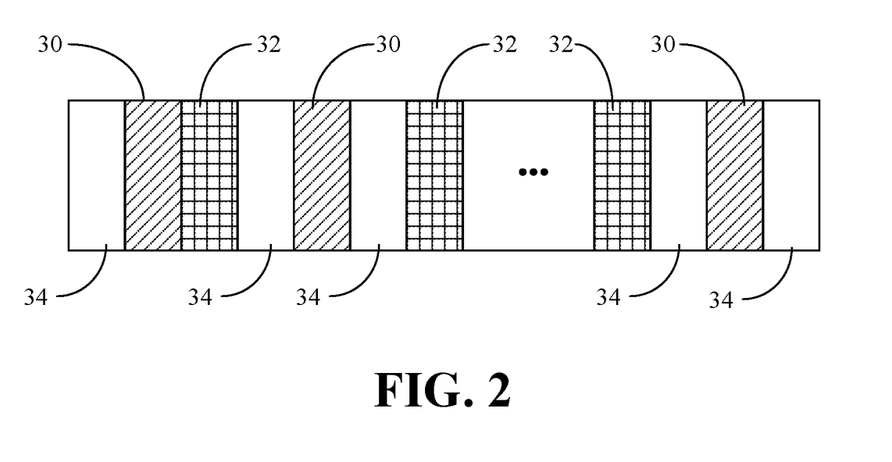
FIG. 2 is an illustration of an example of a non-volatile memory layout that contains data pages as well as page table pages according to an embodiment.

FIG. 2 shows a non-volatile memory layout in which, as a result of dynamic allocation, page table pages 30 are scattered in the non-volatile RAM among data pages 32 and free pages 34. The metadata table technology described herein enables a rebooted OS to distinguish between the pages 30, 32, 34 as well as automatically recover the data pages 32 back into the virtual address space of the applications to which the data pages 32 were allocated prior to the system crash or normal reboot. Embodiments therefore systematically and deterministically restore application data in non-volatile memory after a reboot. More particularly, a metadata table having a standard layout at a fixed offset in the persistent memory may index and store application specific meta-data about the page table pages 30 (e.g., metadata for metadata). In one example, these indexes are updated when an application allocates data on persistent memory. Accordingly, embodiments enable non-volatile memory to be exploited without any need to set up a file system interface (e.g., fsdax mode). Moreover, embodiments do not require extensive modification to applications to exploit non-volatile memory.

The format and layout of the metadata table that contains information about the page table entries of the application may be as follows:

MD_TABLE—a table containing metadata about the page table pages 30;

MD_OFFSET—a pointer to a page aligned physical address offset in the persistent memory that keeps metadata information about the page table pages 30. This information can be passed to the OS in a boot argument list or hardcoded in kernel source code, where the OS does not overwrite this region upon a reboot until the application data is restored;

MD_SIZE—the size of the metadata region. This field may be the first entry at MD_OFFSET, followed by individual MD_TABLE entries. Table I below shows an example format of entries in MD_TABLE.

TABLE I

| Field | Description |
| --- | --- |
| Unique Identifier | A unique identifier (ID) to identify the persistent memory region |
| User | Identifier of the owning application, included |

TABLE I-continued

| Field | Description |
| --- | --- |
| Identifier | for security purposes |
| Root pointer | Pointer to the root of the page table (PGD) |

Figure 3:
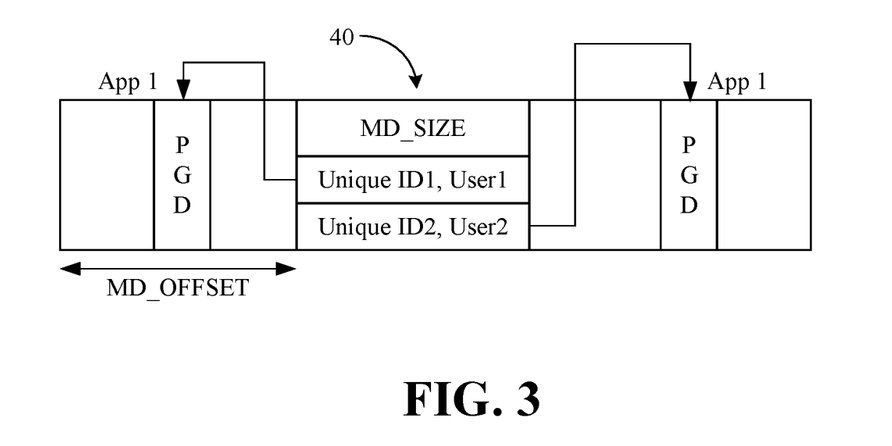
FIG. 3 is an illustration of an example of a metadata table in persistent memory according to an embodiment.

Turning now to FIG. 3 a layout of a metadata table 40 in persistent memory is shown. The illustrated table 40 contains an entry with the fields shown in Table 1 for each application that allocates data on persistent memory. The unique ID may be a system generated number (e.g., with a possible input seed from the application) that identifies the persistent memory region of the application. The unique ID therefore helps applications to identify the persistent region after a reboot. The unique ID may be exported (e.g., via the /proc/<pid>/pmem/unique_id pseudo-file in the LINUX kernel). In an embodiment, the user ID field provides security that prevents other users from accessing the persistent memory region.

The root pointer may point to the root of the page table (PGD). For example, e.g., the pointer may hold the value of a control register (e.g., register CR3), where the page table pages for the data residing in persistent memory are also part of persistent memory. For simplicity, it may be assumed that the entire page table tree of the application resides in persistent memory. It is possible, however, for the page table pages to reside in DRAM and be replicated in persistent memory.

Two application interfaces may be defined to restore the persistent data into the virtual address space after a system reboot:

unsigned long pmem_get(seed), which generates a unique identifier based on a seed value provided by the application. The OS may automatically generate the unique ID if this interface is not called by the application;

pmem_at(unique_id), which attaches the pages pointed by page table tree identified by the unique_id to the virtual address space of the calling application.

Procedure (Before System Crash):

Operation 1—applications that need to recover data from persistent memory after a system reboot either issue pmem_get( ) call or the OS generates a unique_id if a page is allocated on persistent memory;

Operation 2—the OS creates an entry in MD_TABLE and populates the entry with the unique ID, user ID and pointer to the page table tree.

Procedure (after System Crash):

Operation 1—after a system crash, during the boot phase, the OS recognizes the MD_TABLE by reading the MD_OFFSET and MD_SIZE provided in a kernel command line or hardcoded in the kernel source code.

Operation 2—the OS reads the entries in the MD_TABLE and for each entry:

Operation 2A—reads the root of page table tree;
Operation 2B—traverses the page table tree to identify in-use data pages at the time of system crash;
Operation 2C—populates or marks such pages as in-use pages.

Operation 3—the OS builds a list of free pages in persistent memory considering the list of in-use pages identified in Operation 2. This approach ensures that the persistent application data pages are not allocated and overwritten during the boot phase.

Operation 4—the OS completes system boot.

Operation 5—the application is restarted and issues pmem_at(unique_id) system call (e.g., unique_id can be regenerated by issuing pmem_get( ) with the same seed value).

Operation 6—the OS searches for the "unique_id" entry in MD_TABLE and checks for permission by comparing the user ID in MD_TABLE entry with the restarted user ID of the application.

Operation 7—the OS attaches or maps the address space pointed by root pointer of the MD_TABLE entry to the virtual address space of the application.

Operation 8—the Application can now access the data pages on persistent memory.

Optionally, Operation 5 to Operation 8 may be replaced by having a user space tool that provides the unique_id to the kernel and then reads and dumps the persistent data with the help of the kernel to a known location (e.g., disk) to process and recover the data. Thus, the application need not be modified if data is restored using such tools.

Figure 4:
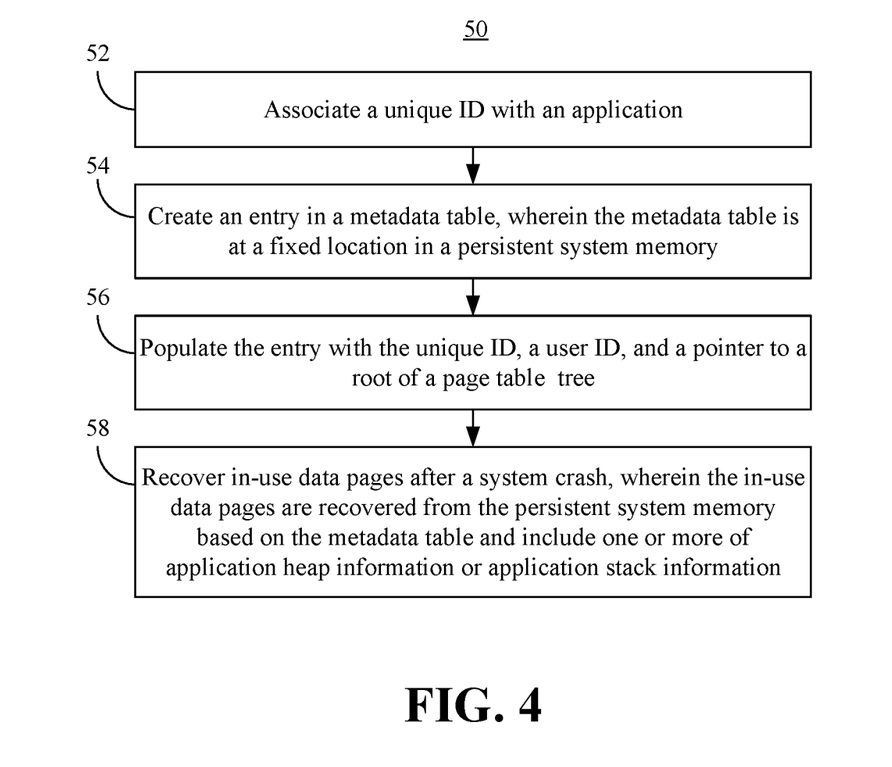
FIG. 4 is a flowchart of an example of a method of operating a performance-enhanced computing system according to an embodiment.

FIG. 4 shows a method 50 of operating a performance-enhanced computing system. The method 50 may be implemented in one or more modules as a set of logic instructions stored in a machine- or computer-readable storage medium such as RAM, read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 associates a unique ID with an application. In one example, block 52 associates the unique ID with the application in response to a request from the application. In another example, block 52 associates the unique ID with the application in response to an allocation of a page in persistent system memory to the application. Block 54 may create an entry in a metadata table, wherein the metadata table is at a fixed location in the persistent system memory. In an embodiment, block 56 populates the entry with the unique ID, a user ID, and a pointer to a root of a page table tree. Block 58 recovers in-use data pages after a system crash, wherein the in-use data pages are recovered from the persistent system memory based on the metadata table. In the illustrated example, the in-use data pages include one or more of application heap information (e.g., process global variables) or application stack information (e.g., process local variables). The illustrated method 50 therefore enhances performance at least to the extent that when the computing system reboots after a system crash or power cycle (e.g., normal reboot), the application data in the persistent system memory becomes usable to the application originally associated with the data. Indeed, the method 50 may obviate any need to allocate new persistent memory to the application after the reboot.

Figure 5:
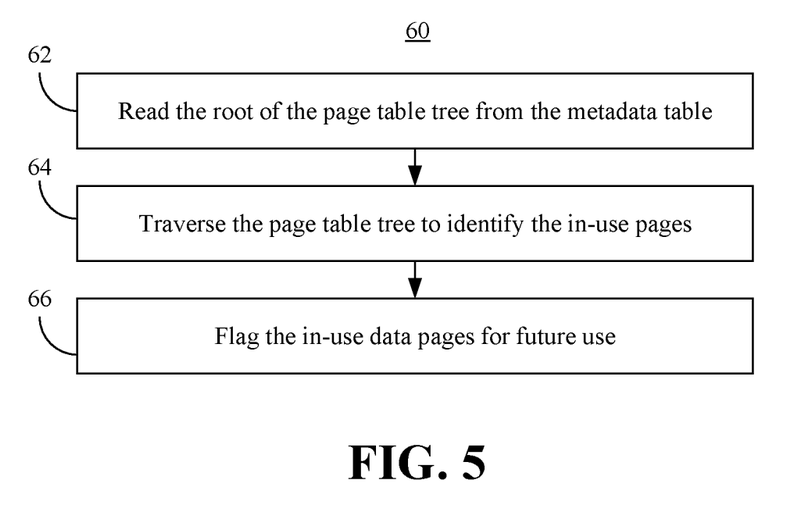
FIG. 5 is a flowchart of an example of a method of recovering in-use data pages according to an embodiment.

FIG. 5 shows a more detailed method 60 of recovering in-use data pages. The method 60 may generally be incorporated into block 58 (FIG. 4), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 provides for reading the root of the page table tree from the metadata table. In an embodiment, block 62 includes recognizing the metadata table based on one or more of a boot argument list or a kernel source code. Additionally, block 64 may traverse the page table tree to identify the in-use pages, where block 66 flags the in-use data pages for future use (e.g., by the application).

Figure 6:
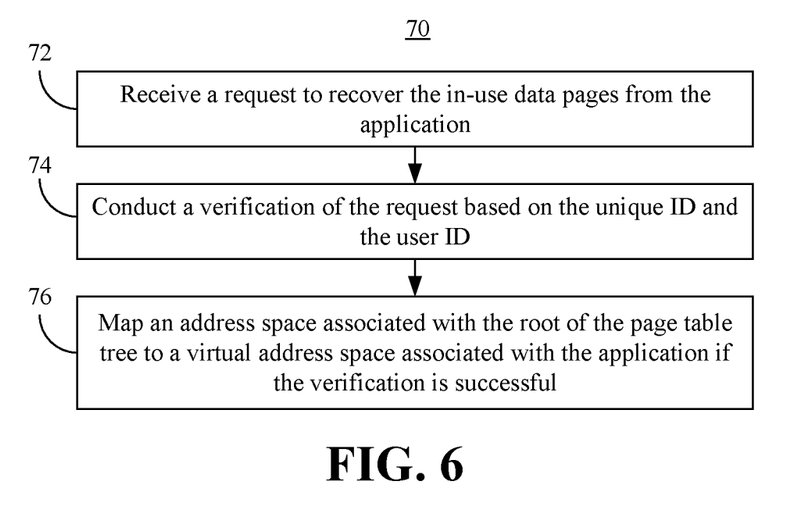
FIG. 6 is a flowchart of an example of a method of managing recovered in-use data pages according to an embodiment.

FIG. 6 shows a method 70 of managing recovered in-use data pages. The method 70 may generally be conducted after the method 50 (FIG. 4), already discussed. More particularly, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 72 provides for receiving a request to recover in-use data pages from an application. In an embodiment, block 74 conducts a verification of the request based on the user ID in the metadata table (e.g., comparing the user ID in the metadata table with the user ID of the application originating the request). Additionally, block 76 may map an address space associated with the root of the page table tree to a virtual address space associated with the application if the verification is successful. If the verification is unsuccessful, the method 70 may bypass block 76.

Figure 7:
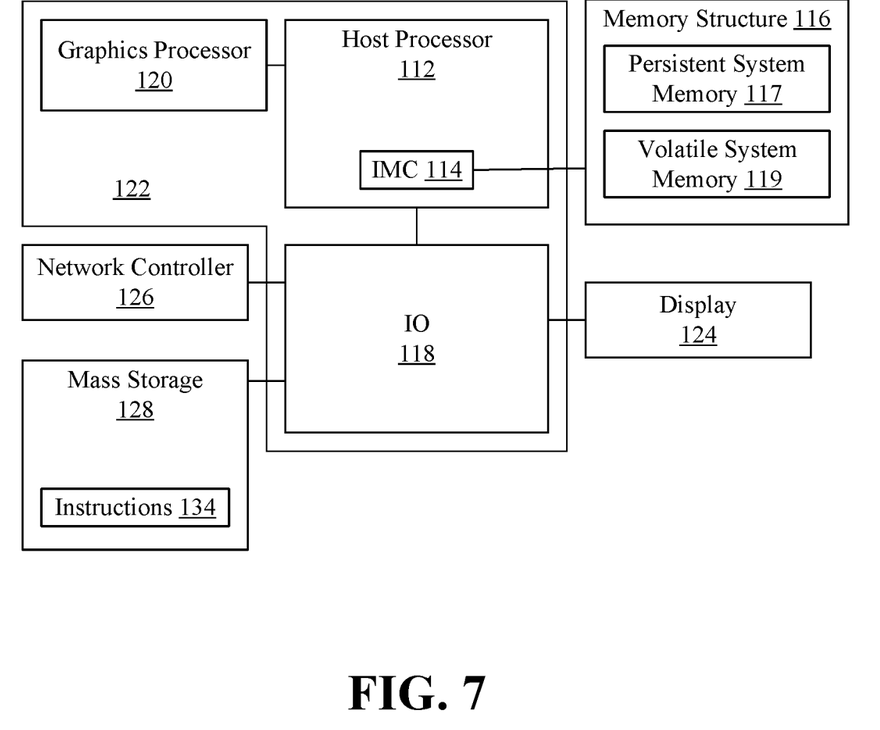
FIG. 7 is a block diagram of an example of a performance-enhanced computing system according to an embodiment.

Turning now to FIG. 7, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 110 includes a host processor 112 (e.g., central processing unit/CPU) having an integrated memory controller (IMC) 114 that is coupled to a memory structure 116. In an embodiment, the memory structure 116 includes a persistent system memory 117 (e.g., non-volatile RAM) and a volatile system memory 119 (e.g., DRAM).

The illustrated system 110 also includes an input output (10) module 118 implemented together with the host processor 112 and a graphics processor 120 (e.g., graphics processing unit/GPU) on a semiconductor die 122 as a system on chip (SoC). The illustrated IO module 118 communicates with, for example, a display 124 (e.g., touch screen, liquid crystal display/LCD, light emitting diode/LED display), a network controller 126 (e.g., wired and/or wireless), and mass storage 128 (e.g., hard disk drive/HDD, optical disk, solid state drive/SSD, flash memory).

In an embodiment, the host processor 112, the graphics processor 120 and/or the IO module 118 execute program instructions 134 retrieved from the memory structure 116 and/or the mass storage 128 to perform one or more aspects of the method 50 (FIG. 4), the method 60 (FIG. 5) and/or the method 70 (FIG. 6), already discussed. Thus, execution of the instructions 134 may cause the semiconductor die 122 and/or the computing system 110 to associate a unique identifier with an application, create an entry in a metadata table, wherein the metadata table is at a fixed location in the persistent system memory 117, populate the entry with the unique identifier, a user identifier, and a pointer to a root of a page table tree, and recover in-use data pages after a system crash. In an embodiment, the in-use data pages are recovered from the persistent system memory 117 based on the metadata table and include one or more of application heap information or application stack information. The system 110 is therefore performance-enhanced at least to the extent that when the computing system 110 reboots after a system crash or power cycle (e.g., normal reboot), the application data in the persistent system memory 117 becomes usable to the application originally associated with the data. Indeed, the instructions 134 may obviate any need to allocate new persistent memory to the application after the reboot.

Figure 8:
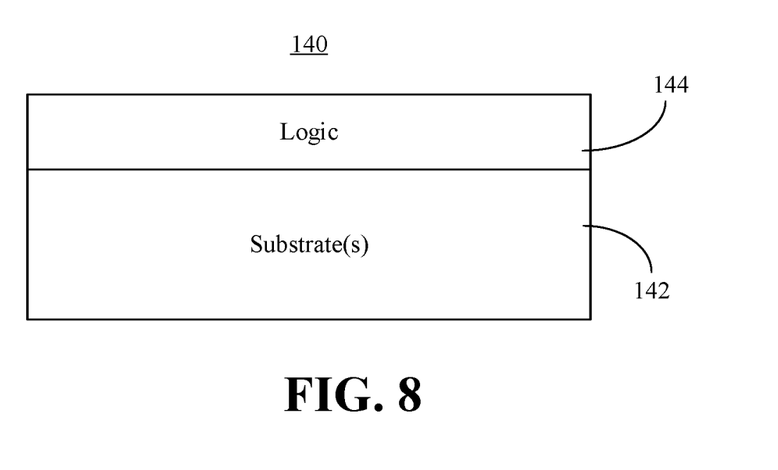
FIG. 8 is an illustration of an example of a semiconductor apparatus according to an embodiment.

FIG. 8 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The logic 144 may be implemented at least partly in configurable logic or fixed-functionality logic hardware. In one example, the logic 144 implements one or more aspects of the method 50 (FIG. 4), the method 60 (FIG. 5) and/or the method 70 (FIG. 6), already discussed. Thus, the logic 144 may associate a unique identifier with an application, create an entry in a metadata table, wherein the metadata table is at a fixed location in persistent system memory, populate the entry with the unique identifier, a user identifier, and a pointer to a root of a page table tree, and recover in-use data pages after a system crash. In an embodiment, the in-use data pages are recovered from the persistent system memory based on the metadata table and include one or more of application heap information or application stack information. The apparatus 140 is therefore performance-enhanced at least to the extent that when the computing system reboots after a system crash or power cycle (e.g., normal reboot), the application data in the persistent system memory becomes usable to the application originally associated with the data. Indeed, the logic 144 may obviate any need to allocate new persistent memory to the application after the reboot.

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 9:
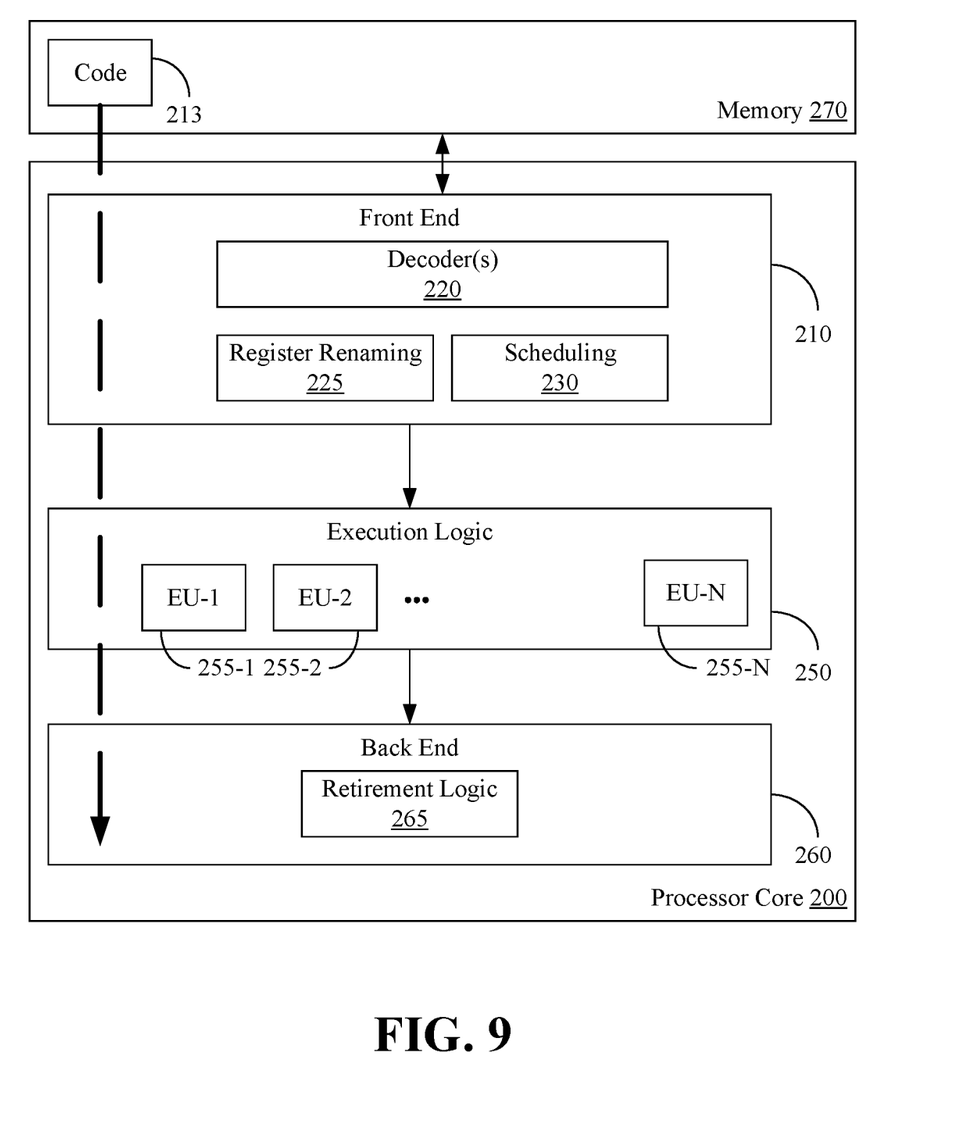
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 50 (FIG. 4), the method 60 (FIG. 5) and/or the method 70 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
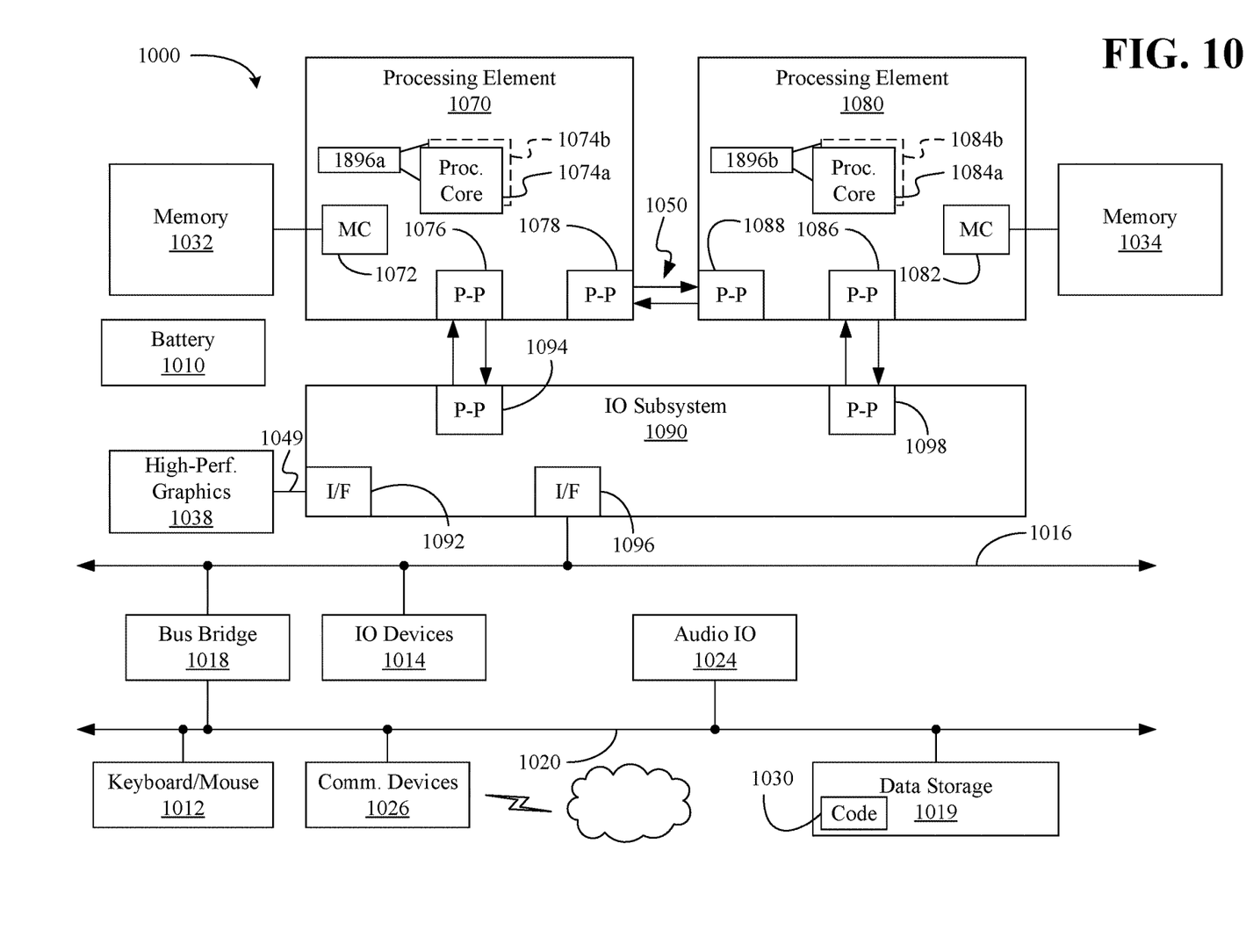
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 50 (FIG. 4), the method 60 (FIG. 5) and/or the method 70 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a network controller, a processor coupled to the network controller, and a memory architecture including volatile system memory, persistent system memory, and a set of executable program instructions, which when executed by the processor, cause the processor to associate a unique identifier with an application, create an entry in a metadata table, wherein the metadata table is at a fixed location in the persistent system memory, populate the entry with the unique identifier, a user identifier, and pointer to a root of a page table tree, and recover in-use data pages after a system crash, wherein the in-use data pages are recovered from the persistent system memory based on the metadata table and include one or more of application heap information or application stack information.

Example 2 includes the computing system of Example 1, wherein to recover the in-use data pages, the instructions, when executed, cause the processor to read the root of the page table tree from the metadata table, traverse the page table tree to identify the in-use data pages, and flag the in-use data pages for future use.

Example 3 includes the computing system of Example 2, wherein the instructions, when executed, cause the processor to recognize the metadata table based on one or more of a boot argument list or a kernel source code.

Example 4 includes the computing system of Example 1, wherein the unique identifier is associated with the application in response to a request from the application.

Example 5 includes the computing system of Example 1, wherein the unique identifier is associated with the application in response to an allocation of a page in the persistent system memory to the application.

Example 6 includes the computing system of any one of Examples 1 to 5, wherein the in-use data pages are recovered in response to a request from the application, and wherein the instructions, when executed, cause the processor to conduct a verification of the request based on the user identifier, and map an address space associated with the root of the page table tree to a virtual address space associated with the application if the verification is successful.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to associate a unique identifier with an application, create an entry in a metadata table, wherein the metadata table is at a fixed location in a persistent system memory, populate the entry with the unique identifier, a user identifier, and a pointer to a root of a page table tree, and recover in-use data pages after a system crash, wherein the in-use data pages are recovered from the persistent system memory based on the metadata table and include one or more of application heap information or application stack information.

Example 8 includes the semiconductor apparatus of Example 7, wherein to recover the in-use data pages, the logic coupled to the one or more substrates is to read the root of the page table tree from the metadata table, traverse the page table tree to identify the in-use data pages, and flag the in-use data pages for future use.

Example 9 includes the semiconductor apparatus of Example 8, wherein the logic coupled to the one or more substrates is to recognize the metadata table based on one or more of a boot argument list or a kernel source code.

Example 10 includes the semiconductor apparatus of Example 7, wherein the unique identifier is associated with the application in response to a request from the application.

Example 11 includes the semiconductor apparatus of Example 7, wherein the unique identifier is associated with the application in response to an allocation of a page in the persistent system memory to the application.

Example 12 includes the semiconductor apparatus of any one of Examples 7 to 11, wherein the in-use data pages are recovered in response to a request from the application, and wherein the logic coupled to the one or more substrates is to conduct a verification of the request based on the user identifier, and map an address space associated with the root of the page table tree to a virtual address space associated with the application if the verification is successful.

Example 13 includes the semiconductor apparatus of any one of Examples 7 to 11, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to associate a unique identifier with an application, create an entry in a metadata table, wherein the metadata table is at a fixed location in a persistent system memory, populate the entry with the unique identifier, a user identifier, and a pointer to a root of a page table tree, and recover in-use data pages after a system crash, wherein the in-use data pages are recovered from the persistent system memory based on the metadata table and include one or more of application heap information or application stack information.

Example 15 includes the at least one computer readable storage medium of Example 14, wherein to recover the in-use data pages, the instructions, when executed, cause the computing system to read the root of the page table tree from the metadata table, traverse the page table tree to identify the in-use data pages, and flag the in-use data pages for future use.

Example 16 includes the at least one computer readable storage medium of Example 15, wherein the instructions, when executed, cause the computing system to recognize the metadata table based on one or more of a boot argument list or a kernel source code.

Example 17 includes the at least one computer readable storage medium of Example 14, wherein the unique identifier is associated with the application in response to a request from the application.

Example 18 includes the at least one computer readable storage medium of Example 14, wherein the unique identifier is associated with the application in response to an allocation of a page in the persistent system memory to the application.

Example 19 includes the at least one computer readable storage medium of any one of Examples 14 to 18, wherein the in-use data pages are recovered in response to a request from the application, and wherein the instructions, when executed, cause the computing system to conduct a verification of the request based on the user identifier, and map an address space associated with the root of the page table tree to a virtual address space associated with the application if the verification is successful.

Example 20 includes a method comprising associating a unique identifier with an application, creating an entry in a metadata table, wherein the metadata table is at a fixed location in a persistent system memory, populating the entry with the unique identifier, a user identifier, and a pointer to a root of a page table tree, and recovering in-use data pages after a system crash, wherein the in-use data pages are recovered from the persistent system memory based on the metadata table and include one or more of application heap information or application stack information.

Example 21 includes the method of Example 20, wherein recovering the in-use data pages includes reading the root of the page table tree from the metadata table, traversing the page table tree to identify the in-use data pages, and flagging the in-use data pages for future use.

Example 22 includes the method of Example 21, further including recognizing the metadata table based on one or more of a boot argument list or a kernel source code.

Example 23 includes the method of Example 20, wherein the unique identifier is associated with the application in response to a request from the application.

Example 24 includes the method of Example 20, wherein the unique identifier is associated with the application in response to an allocation of a page in the persistent system memory to the application.

Example 25 includes the method of any one of Examples 20 to 24, wherein the in-use data pages are recovered in response to a request from the application, the method further including conducting a verification of the request based on the user identifier, and mapping an address space associated with the root of the page table tree to a virtual address space associated with the application if the verification is successful.

Example 26 includes means for performing the method of any one of Examples 20 to 25.

The technology described herein therefore enables system developers to exploit non-volatile memory without a need to configure and setup the system with fsdax. The technology also does not require extensive modification to the applications to exploit persistent memory. Indeed, the technology is more effective than conventional data replication and checkpointing techniques. For example, data replication consumes valuable resources. Additionally, in a system that uses only checkpointing to restore data, the recoverable data is limited to the data saved as of the last checkpoint (e.g., losing form data entered via a browser after the last checkpoint). By contrast, the technology described herein avoids freezing the application to perform the checkpointing operation, avoids the transfer of large amounts of data, and does not lose any computation. The technology may also be combined with page level auto-persistence, which may not enable the OS to recognize the data pages belonging to each application prior to a system crash.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

Example Application:

```
int main( )
{
    void *data_addr = 0x0550060000;
    ...
    ...
    ...
    /* mmap syntax: mmap(void *addr, size_t length, int prot,
            int flags, int fd, off_t offset); */
    mmap(data_addr, 10GB, PROT_READ | PROT_WRITE,
            MAP_ANONYMOUS, -1, 0);
    /* Initialize data pointed by data addr */
    ...
    ...
    ...
}
Modified application:
int main( )
{
    void *data_addr = 0x0550060000;
    unsigned long unique_id;
    unsigned long seed = 0X12AB34CD;
        unique_id = pmem_get(seed);
    ...
    ...
    ...
    if (pmem_at(unique_id) < 0) {
        /* pmem_at( ) failed due to:
            1: This is a fresh start of the application.
                Pmem_at returns EINVAL.
            2: No permission to persistent data pages.
                EPERM is returned. Exit the program
        */
        if (ERRNO == EINVAL) {
            /* Application started afresh */
            mmap(data_addr, 10GB, PROT_READ |
            PROT_WRITE,
                MAP ANONYMOUS, -1, 0);
            /* Initialize data pointed by data_ptr */
            ...
            ...
            ...
        }
    }
    /* If we are here then the application is restarted
        after a system crash. The pmem_at( ) call restores the
        virtual address space of the application. The kernel
        finds a page table entry (created by the mmap( ) call
        issued before the system crash) at address 0x0550060000
        in MD_TABLE and restores the mapping at 0x0550060000.
    */
    /* Access or restore the data using data_addr */
    ...
    ...
    ...
}
```

We claim:

1. A computing system comprising:
a network controller;
a processor coupled to the network controller; and
a memory architecture including volatile system memory, persistent system memory, and a set of executable program instructions, which when executed by the processor, cause the processor to:
associate a unique identifier with an application,
create an entry in a metadata table, wherein the metadata table is at a fixed location in the persistent system memory,
populate the entry with the unique identifier, a user identifier, and a pointer to a root of a page table tree, and
recover in-use data pages after a system crash, wherein the in-use data pages are recovered from the persistent system memory based on the metadata table and include application heap information and application stack information.

2. The computing system of claim 1, wherein to recover the in-use data pages, the instructions, when executed, cause the processor to:
read the root of the page table tree from the metadata table;
traverse the page table tree to identify the in-use data pages; and
flag the in-use data pages for future use.

3. The computing system of claim 2, wherein the instructions, when executed, cause the processor to recognize the metadata table based on one or more of a boot argument list or a kernel source code.

4. The computing system of claim 1, wherein the unique identifier is associated with the application in response to a request from the application.

5. The computing system of claim 1, wherein the unique identifier is associated with the application in response to an allocation of a page in the persistent system memory to the application.

6. The computing system of claim 1, wherein the in-use data pages are recovered in response to a request from the application, and wherein the instructions, when executed, cause the processor to:
conduct a verification of the request based on the user identifier; and
map an address space associated with the root of the page table tree to a virtual address space associated with the application if the verification is successful.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
associate a unique identifier with an application;
create an entry in a metadata table, wherein the metadata table is at a fixed location in a persistent system memory;
populate the entry with the unique identifier, a user identifier, and a pointer to a root of a page table tree; and
recover in-use data pages after a system crash, wherein the in-use data pages are recovered from the persistent system memory based on the metadata table and include application heap information and application stack information.

8. The semiconductor apparatus of claim 7, wherein to recover the in-use data pages, the logic coupled to the one or more substrates is to:
read the root of the page table tree from the metadata table;
traverse the page table tree to identify the in-use data pages; and
flag the in-use data pages for future use.

9. The semiconductor apparatus of claim 8, wherein the logic coupled to the one or more substrates is to recognize the metadata table based on one or more of a boot argument list or a kernel source code.

10. The semiconductor apparatus of claim 7, wherein the unique identifier is associated with the application in response to a request from the application.

11. The semiconductor apparatus of claim 7, wherein the unique identifier is associated with the application in response to an allocation of a page in the persistent system memory to the application.

12. The semiconductor apparatus of claim 7, wherein the in-use data pages are recovered in response to a request from the application, and wherein the logic coupled to the one or more substrates is to:
conduct a verification of the request based on the user identifier; and
map an address space associated with the root of the page table tree to a virtual address space associated with the application if the verification is successful.

13. The semiconductor apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:
associate a unique identifier with an application;
create an entry in a metadata table, wherein the metadata table is at a fixed location in a persistent system memory;
populate the entry with the unique identifier, a user identifier, and a pointer to a root of a page table tree; and
recover in-use data pages after a system crash, wherein the in-use data pages are recovered from the persistent system memory based on the metadata table and include application heap information and application stack information.

15. The at least one non-transitory computer readable storage medium of claim 14, wherein to recover the in-use data pages, the instructions, when executed, cause the computing system to:
read the root of the page table tree from the metadata table;
traverse the page table tree to identify the in-use data pages; and
flag the in-use data pages for future use.

16. The at least one non-transitory computer readable storage medium of claim 15, wherein the instructions, when executed, cause the computing system to recognize the metadata table based on one or more of a boot argument list or a kernel source code.

17. The at least one non-transitory computer readable storage medium of claim 14, wherein the unique identifier is associated with the application in response to a request from the application.

18. The at least one non-transitory computer readable storage medium of claim 14, wherein the unique identifier is associated with the application in response to an allocation of a page in the persistent system memory to the application.

19. The at least one non-transitory computer readable storage medium of claim 14, wherein the in-use data pages are recovered in response to a request from the application, and wherein the instructions, when executed, cause the computing system to:
conduct a verification of the request based on the user identifier; and
map an address space associated with the root of the page table tree to a virtual address space associated with the application if the verification is successful.

20. A method comprising:
associating a unique identifier with an application;
creating an entry in a metadata table, wherein the metadata table is at a fixed location in a persistent system memory;
populating the entry with the unique identifier, a user identifier, and a pointer to a root of a page table tree; and
recovering in-use data pages after a system crash, wherein the in-use data pages are recovered from the persistent system memory based on the metadata table and include application heap information and application stack information.

21. The method of claim 20, wherein recovering the in-use data pages includes:
reading the root of the page table tree from the metadata table;
traversing the page table tree to identify the in-use data pages; and
flagging the in-use data pages for future use.

22. The method of claim 21, further including recognizing the metadata table based on one or more of a boot argument list or a kernel source code.

23. The method of claim 20, wherein the unique identifier is associated with the application in response to a request from the application.

24. The method of claim 20, wherein the unique identifier is associated with the application in response to an allocation of a page in the persistent system memory to the application.

25. The method of claim 20, wherein the in-use data pages are recovered in response to a request from the application, the method further including:
conducting a verification of the request based on the user identifier; and
mapping an address space associated with the root of the page table tree to a virtual address space associated with the application if the verification is successful.

* * * * *